United States Patent
Kim et al.

(10) Patent No.: US 7,366,117 B2
(45) Date of Patent: Apr. 29, 2008

(54) METHOD AND APPARATUS FOR SHARING A DOWNLINK DEDICATED PHYSICAL CHANNEL IN A NARROW-BAND TIME DIVISION DUPLEXING SYSTEM

(75) Inventors: Song-Hun Kim, Suwon-si (KR); Hyeon-Woo Lee, Suwon-si (KR); Seong-Ill Park, Seongnam-si (KR); Jin-Weon Chang, Suwon-si (KR); Ju-Ho Lee, Suwon-si (KR); Kwang-Yung Jeong, Yongin-si (KR); Hye-Young Lee, Seoul (KR); Young-Bin Chang, Seoul (KR); Jin-Seok Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 608 days.

(21) Appl. No.: 11/054,462

(22) Filed: Feb. 9, 2005

(65) Prior Publication Data

US 2005/0220068 A1    Oct. 6, 2005

(30) Foreign Application Priority Data

Feb. 10, 2004    (KR) ...................... 10-2004-0008629

(51) Int. Cl.
*H04J 3/00*    (2006.01)

(52) U.S. Cl. ...................... 370/280; 370/329; 370/437; 455/450

(58) Field of Classification Search .................... None
See application file for complete search history.

(56) References Cited

U.S. PATENT DOCUMENTS

| 7,088,688 | B2 * | 8/2006 | Kim et al. ................. 370/280 |
| 2003/0083070 | A1 * | 5/2003 | Ishikawa et al. ............ 455/436 |
| 2003/0232622 | A1 * | 12/2003 | Seo et al. .................. 455/437 |
| 2006/0002323 | A1 * | 1/2006 | Hildebrand et al. ........ 370/321 |

* cited by examiner

*Primary Examiner*—Phirin Sam
(74) *Attorney, Agent, or Firm*—The Farrell Law Firm, PC

(57) ABSTRACT

A method and apparatus for sharing a DL-DPCH in an NB-TDD system. Two time slots at the same position in two subframes forming one radio frame are allocated as a DPCH for two UEs. A Node B arranges data and control information for the UEs in the two time slots and transmits the data and control information to the UEs. The UEs extract the data and control information from the two time slots and acquire the data and control information destined for the individual UEs.

16 Claims, 6 Drawing Sheets

METHOD AND APPARATUS FOR SHARING A DOWNLINK DEDICATED PHYSICAL CHANNEL IN A NARROW-BAND TIME DIVISION DUPLEXING SYSTEM

PRIORITY

This application claims priority under 35 U.S.C. § 119 to an application entitled "Method and Apparatus for Sharing Downlink Dedicated Physical Channel in a Narrow-Band Time Division Duplexing System" filed in the Korean Intellectual Property Office on Feb. 10, 2004 and assigned Ser. No. 2004-8629, the contents of which are incorporated herein by reference.

BACKGROUND OF THE INVENTION

1. Field of the Invention

The present invention relates generally to an NB-TDD (Narrow-Band Time Division Duplexing) system, and in particular, to a method and apparatus for sharing a DL-DPCH (Downlink Dedicated Physical Channel).

2. Description of the Related Art

Subscribers to wireless communication networks, such as cellular, PCS (Personal Communications Services), and IMT-2000 (International Mobile Telecommunication-2000) communication systems, can connect to the Internet in any environment by using Internet-enabled mobile terminals or by connecting laptop computers to an existing mobile communication network, e.g., through software/hardware MODEMs.

UMTS (Universal Mobile Telecommunications System) or WCDMA (Wideband Code Division Multiple Access), a 3rd generation communication system, is developed to work with a packet switching system such as GPRS (General Packet Radio Services) using CDMA (Code Division Multiple Access). The UMTS system supports high-speed packet data service as well as voice service, and enables high-speed transmission of data and moving pictures. Commonly, a radio network in the UMTS communication system is called a UTRAN (UMTS Radio Access Network), or more simply a RAN. The RAN includes Node Bs, which are equivalent to base stations, and RNCs (Radio Network Controllers), which are equivalent to base station controllers (BSCs).

NB-TDD is one of the $3^{rd}$ generation standards for physical interfacing between a Node B and a UE (User Equipment) in the WCDMA communication system.

FIG. 1 illustrates a conventional NB-TDD physical channel configuration. Referring to FIG. 1, an NB-TDD physical channel can be divided into radio frames 101, each being 10 ms in duration. Each radio frame 101 is further divisible into two subframes 102. Each subframe 102 includes a DwPCH (Downlink Pilot Channel) 103, a guard period (GP) 104, an UpPCH (Uplink Pilot Channel) 105, and 7 time slots (TSs) 106 (TS #0-TS #6) for delivering data.

Each TS 106 can be divided into 4 parts: a 352-chip first data area 107, a 144-chip midamble 108, a 352-chip second data area 109, and a 16-chip GP 110.

However, the above-described TS structure is a mere example. Therefore, the TS format varies with the configuration of an actual channel.

For example, in FIG. 1, a TFCI (Transport Format Combination Indicator) is separated into two parts 111 and 112. The TFCIs 111 and 112 are positioned before the first and second data areas 107 and 109, respectively. As another example, synchronization information, an SS (Synchronization Shift) 113 and a TPC (Transmit Power Control) 114 may further be included.

The TFCIs 111 and 112 indicate how transport channels at a higher layer than physical channels are mapped to the physical channels. The SS 113 is used by a UE to synchronize to a Node B for uplink transmission. The TPC 114 is used to control transmit power. Each radio frame is code-divided by 16 codes.

Two time slots at the same position in two subframes of each radio frame form one channel. For example, the second TS in the first subframe and the second TS in the second subframe are used as a DPCH for a specific UE. The DPCH delivers a control parameter from the Node B to the UE, which is essential in determining the structure of an enhanced uplink on which the UE transmits data at high rate to the Node B.

However, the control parameter is rather small in size. Therefore, it may not always need to occupy two TSs, that is, one DPCH fully. In this case, the dedicated use of the DPCH for one UE unnecessarily dissipates all the system resources.

SUMMARY OF THE INVENTION

Therefore, an object of the present invention is to substantially solve at least the above problems and/or disadvantages and to provide at least the advantages below.

Accordingly, an object of the present invention is to provide a method and apparatus for saving downlink physical channel resources when transmitting a control parameter for an enhanced uplink service in an NB-TDD communication system.

Another object of the present invention is to provide a method and apparatus for sharing a data area of an NB-TDD DL-DPCH between at least two UEs.

The above objects are achieved by a method and apparatus for sharing a DL-DPCH in an NB-TDD system.

According to one aspect of the present invention, in a method for sharing a DL-DPCH in an NB-TDD system, two time slots at the same position in two subframes forming one radio frame are allocated as a DPCH for two UEs. Data and control information for the UEs are arranged in the two time slots and transmitted to the UEs. The data and control information are extracted from the two time slots and the data and control information destined for the individual UEs are acquired in the UEs.

According to another aspect of the present invention, in an apparatus for sharing a DL-DPCH in an NB-TDD system, a transmitter allocates two time slots at the same position in two subframes forming one radio frame as a DPCH for first and second UEs, arranges data and control information for the UEs in the two time slots, and transmits the data and control information to the UEs. A receiver in each of the UEs extracts the data and control information from the two time slots and acquires the data and control information destined for the UE. In the transmitter, a first data generator generates first data for the first UE, a second data generator generates second data for the second UE, a first data divider divides the first data into two first data segments, a second data divider divides the second data into two second data segments, a first control information generator selectively generates first control information for the first UE, a second control information generator selectively generates second control information for the second UE, and a frame configurer forms a radio frame with two subframes including two allocated time slots in which the first and second data segments and the first and second control information are arranged at predetermined positions. In the receiver, a frame analyzer receives the radio frame, separating the radio frame into the two subframes and detects the two time slots from the subframes, a control information extractor detects desired control information from the two time slots according to a predetermined time slot structure, and a data extractor detects desired data segments from the two time slots.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described in detail herein below with reference to the accompanying drawings. In the following description, well-known functions or constructions are not described in detail because they would obscure the invention in unnecessary detail.

Figure 1:
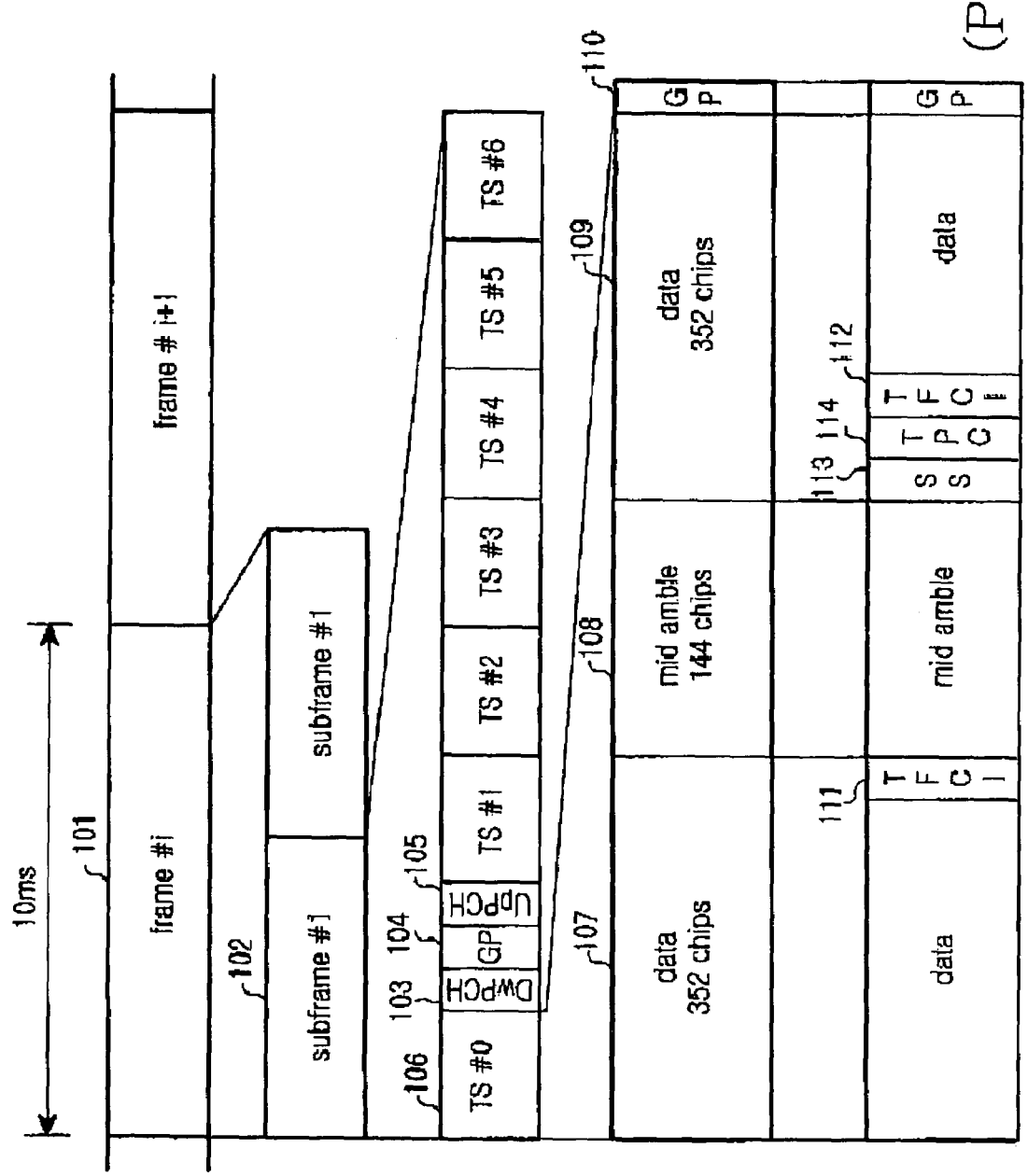
FIG. 1 illustrates a conventional NB-TDD radio frame and its underlying architecture.

The present invention enables a DPCH to be shared between at least two UEs in an NB-TDD communication system. The following description of the present invention is made herein below for a radio interface between a Node B and a UE that use an NB-TDD physical channel. The NB-TDD physical channel is configured as described above with reference to FIG. 1.

Two TSs at the same position in two subframes of an NB-TDD physical channel radio frame are allocated as a DPCH for two UEs. That is, the two TSs form a DPCH shared between two UEs. The channel allocation is performed by a Node B or a higher-layer system.

The Node B sends data and control information to the two UEs in the two TSs. The data and control information is loaded at predetermined positions in the two TSs, such that both the UEs extract data and control information destined for them from the predetermined positions.

Figure 2:
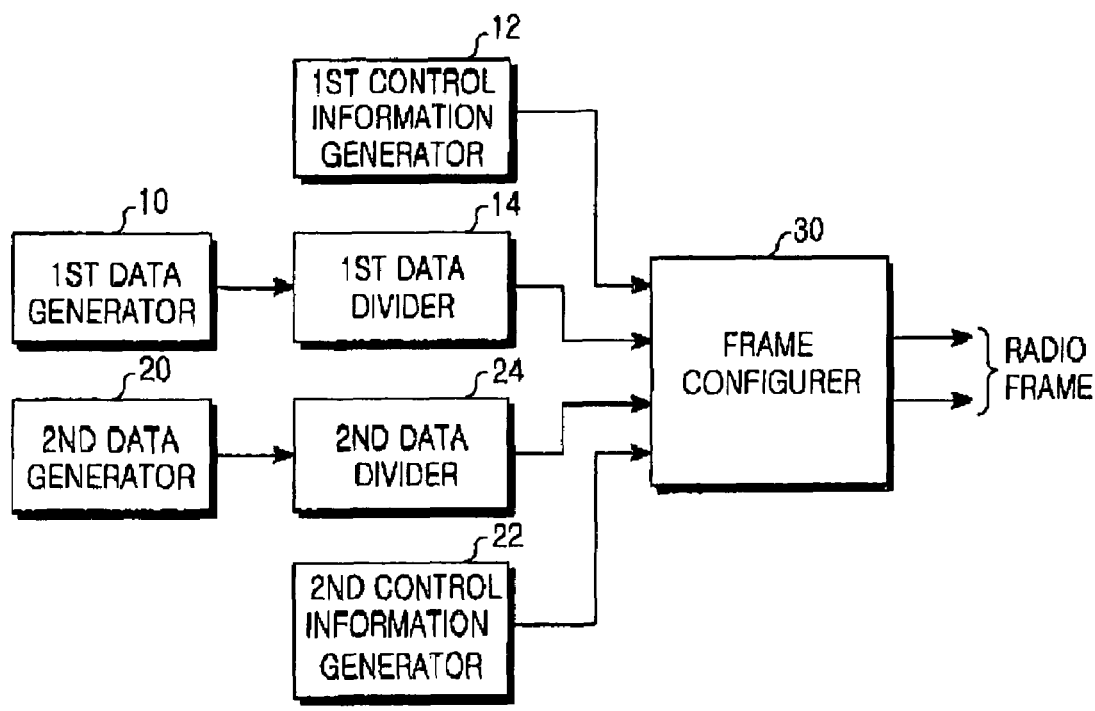
FIG. 2 is a block diagram of a physical channel transmitter according to a preferred embodiment of the present invention.

FIG. 2 is a block diagram of a physical channel transmitter according to a preferred embodiment of the present invention. For the downlink directed from the Node B to the UE, the illustrated physical channel transmitter is provided in the Node B. This physical channel transmitter is responsible for a predetermined one physical channel with two TSs at the same position in the two subframes of one radio frame. Because the TSs of each subframe are allocated to different physical channels, the terms TS and subframe can be interchangeably used with the same meaning for each physical channel.

Referring to FIG. 2, a first data generator 10, a first data divider 14, and a first control information generator 12 are provided for one (a first UE) of the UEs sharing the physical channel, and a second data generator 20, a second data divider 24, and a second control information generator 22 are provided for the other UE (a second UE).

The first data generator 10 generates data destined for the first UE, specifically a first data unit including a control parameter related to the structure of an enhanced uplink directed from the first UE to the Node B. The first data divider 14 divides the first data unit into two data segments to be loaded in the two subframes of one radio frame, i.e., in two allocated TSs. In the same manner, the second data generator 20 generates a second data unit for the second UE and the second data divider 24 divides the second data unit into two data segments.

The first and second control information generators 12 and 22 generate control information for the first and second UEs, i.e., TFCI, SS, and TPC, when needed. A frame configurer 30 generates an NB-TDD frame, that is, a radio frame, by positioning the data segments and the control information at appropriate positions in the two TSs. The structure of a TS will be described herein in more detail later. The radio frame is converted to a radio signal and transmitted to the two UEs.

Figure 3:
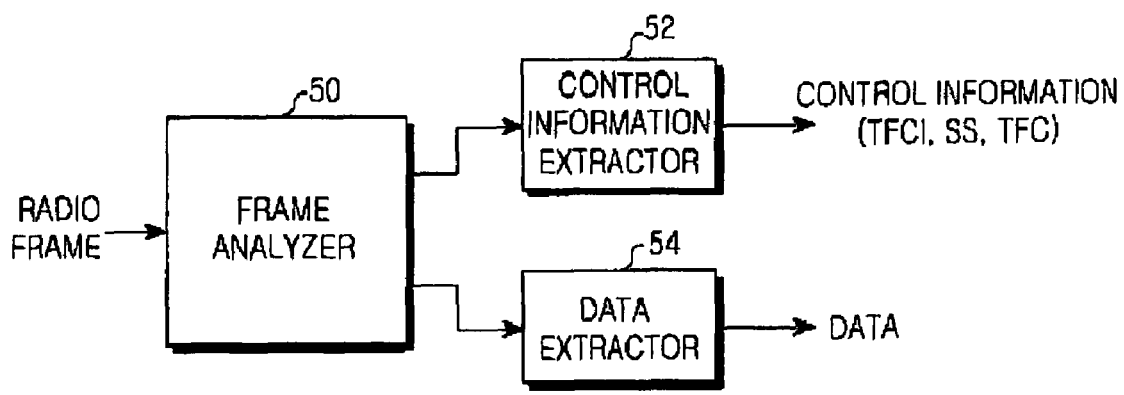
FIG. 3 is a block diagram of a physical channel receiver according to a preferred embodiment of the present invention.

FIG. 3 is a block diagram of a physical channel receiver for receiving an NB-TDD frame according to a preferred embodiment of the present invention. The physical channel receiver is the counterpart of the physical channel transmitter illustrated in FIG. 2. For the downlink, the physical channel receiver is provided in each UE.

Referring to FIG. 3, the NB-TDD frame received from the Node B is provided to a frame analyzer 50. The frame analyzer 50 separates the radio frame into two subframes and detects two allocated TSs from the subframes. A control information extractor 52 detects control information destined for the physical channel receiver according to a TS structure preset between the physical channel receiver and transmitter. Similarly, a data extractor 54 detects data segments destined for the physical channel receiver from the two TSs.

The two UEs sharing the physical channel receive the TSs at the same position and acquire data and control information at predetermined positions in the TSs.

Figure 4:
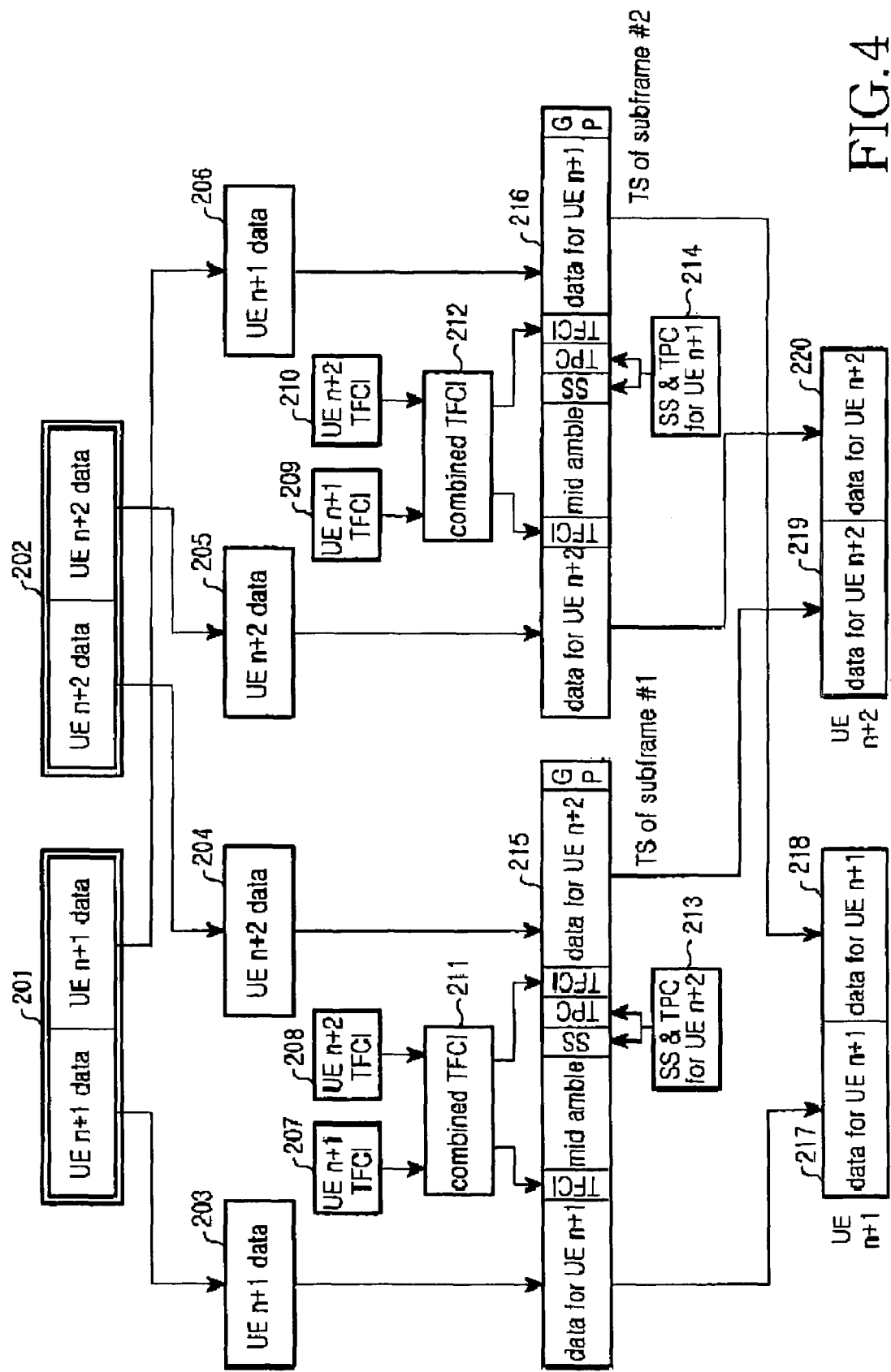
FIG. 4 illustrates a shared TS according to an embodiment of the present invention.

FIG. 4 illustrates a shared TS according to an embodiment of the present invention. As illustrated in FIG. 4, two TSs at the same position in the two subframes of each radio frame are allocated to two UEs such that one DPCH formed with the two TSs is shared between the two UEs.

Referring to FIG. 4, the two UEs sharing a DPCH are denoted by "a UE n+1" and "a UE n+2," respectively and data units for the two UEs are denoted by "UE n+1 data" 201 and "UE n+2 data" 202, respectively. Both the data units 201 and 202 are encoded in a higher layer to have a size suitable for two TSs.

The UE n+1 data 201 is segmented into two data segments 203 and 206, and the UE n+2 data 202 is segmented into two data segments 204 and 205. A first data segment 203 of the UE n+1 data 201 is loaded in the first data area of the first subframe and a second data segment 206 in the last data area of the second subframe. A first data segment 204 of the UE n+2 data 202 is loaded in the last data area of the first subframe and a second data segment 205 in the first data area of the second subframe.

If it is determined to further transmit the control information of a TFCI, an SS, and a TPC when necessary in the Node B, the control information is also divided across two subframes.

A typical TFCI is interpreted on a radio frame basis. In this case, because the TFCI cannot be interpreted until the second subframe is received, a time delay as long as one subframe duration, e.g., 5 ms occurs. Therefore, the TFCI is delivered on a subframe basis to enable interpretation of the TFCI on a subframe basis in a preferred embodiment of the present invention.

Returning to FIG. 4, a UE n+1 TFCI 207 is combined with a UE n+2 TFCI 208 and loaded in the TFCI area of the TS in the first subframe. In the same manner, a UE n+1 TFCI 209 is combined with a UE n+2 TFCI 210 and loaded in the TFCI area of the TS in the second subframe. The TFCIs for each of the UEs, for example, the TFCIs 207 and 209 may be the same TFCI or the two equal halves of one TFCI.

Regarding the SS and the TPC, the Node B combines SSs and TPCs for the two UEs, respectively and sends the combined SS and the combined TPC each in one of the two subframes. Alternatively, the Node B sends the SS and TPC of the UE n+1 and the SS and TPC of the UE n+2 in the different subframes, as illustrated in FIG. 4.

In FIG. 4, the SS and TPC of the UE n+1 are disposed at a predetermined position 213 in the first subframe, whereas the SS and TPC of the UE n+2 are disposed at a predetermined position 214 in the second subframe.

The UE n+1 receives the thus-configured TSs illustrated in FIG. 3, detects a first data segment 217 from the first data area of the first subframe and a second data segment 218 from the last data area of the second subframe, and combines them. In the same manner, the UE n+2 detects a first data segment 219 from the last data area of the first subframe and a second data segment 220 from the first data area of the second subframe, and combines them.

The TS structure illustrated in FIG. 4 is a preferred embodiment of the present invention. It is noted, however, the positions of the control information, TFCI, SS, and TPC can vary with embodiments of the present invention. For example, in the embodiments of the present invention illustrated in FIGS. 5, 6, and 7, the TFCIs are delivered on a subframe basis or on a radio frame basis. The SS and TPC for one UE and the SS and TPC for the other UE are delivered in different subframes, or the SSs and TPCs of both the UEs are delivered in combination in each subframe.

Figure 5:
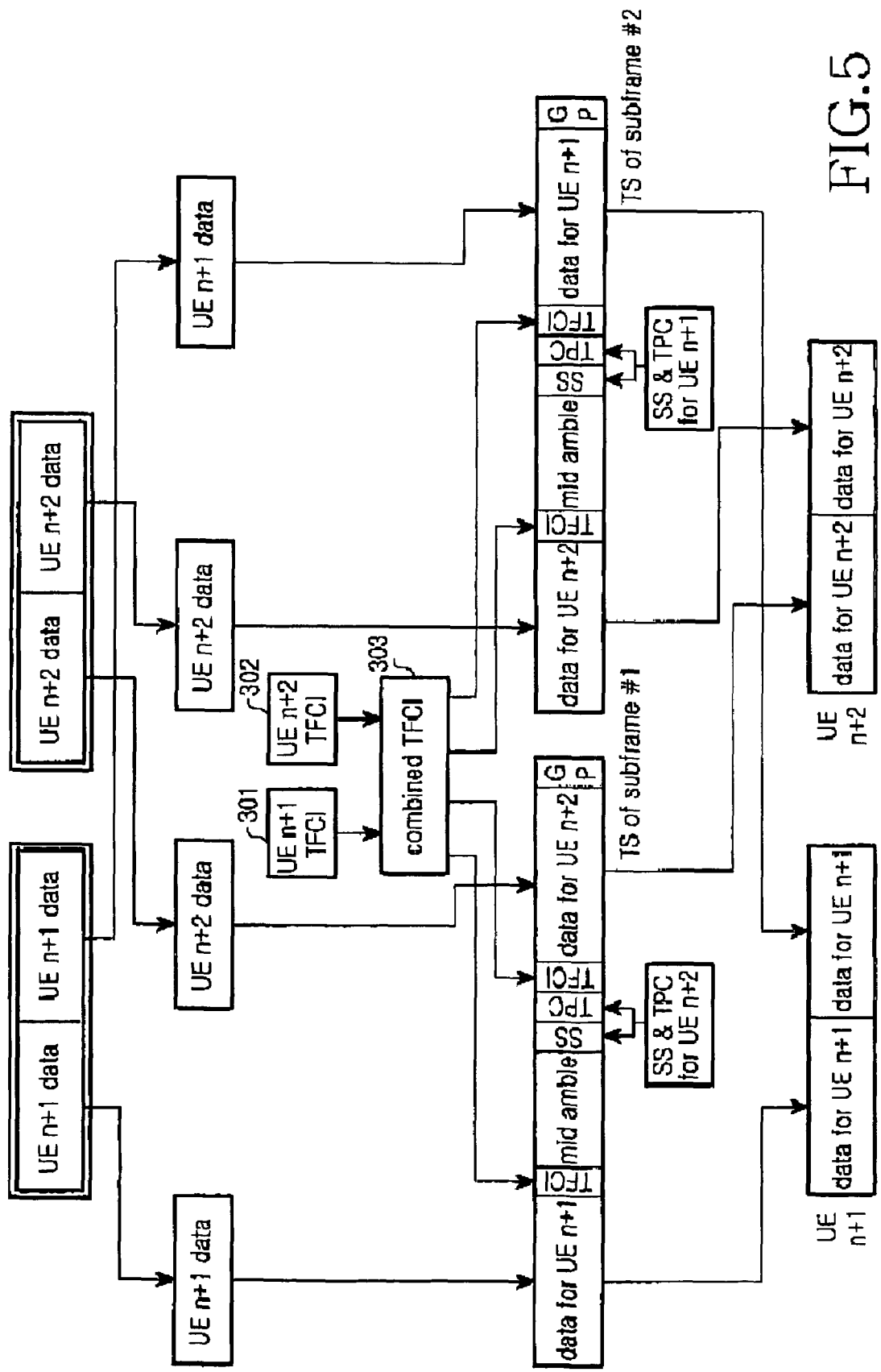
FIG. 5 illustrates a shared TS according to another embodiment of the present invention.

Referring to FIG. 5, TFCIs 301 and 302 for the UE n+1 and the UE n+2 are to be interpreted on a radio frame basis. The frame configurer 30 in the Node B combines the TFCIs 301 and 302 to one combined TFCI 303 in a predetermined method. The combined TFCI is distributively allocated in two subframes, that is, at predetermined positions in two allocated TSs. The distribution can be done by dividing the combined TFCI into two equal halves, on a bit basis, etc., which is beyond the scope of the present invention and thus will not be described in further detail.

In the same manner as illustrated in FIG. 5, the SS/TPC of the UE n+1 is disposed at a predetermined position of an allocated TS in the second subframe, and the SS/TPC of the UE n+2 at a predetermined position of an allocated TS in the first subframe.

The control information extractor 52 in each of the UEs extracts the combined TFCI at predetermined positions in the two TSs, decomposes the combined TFCI into original TFCIs in the reverse order of the combination performed in the Node B, and acquires an intended TFCI.

Figure 6:
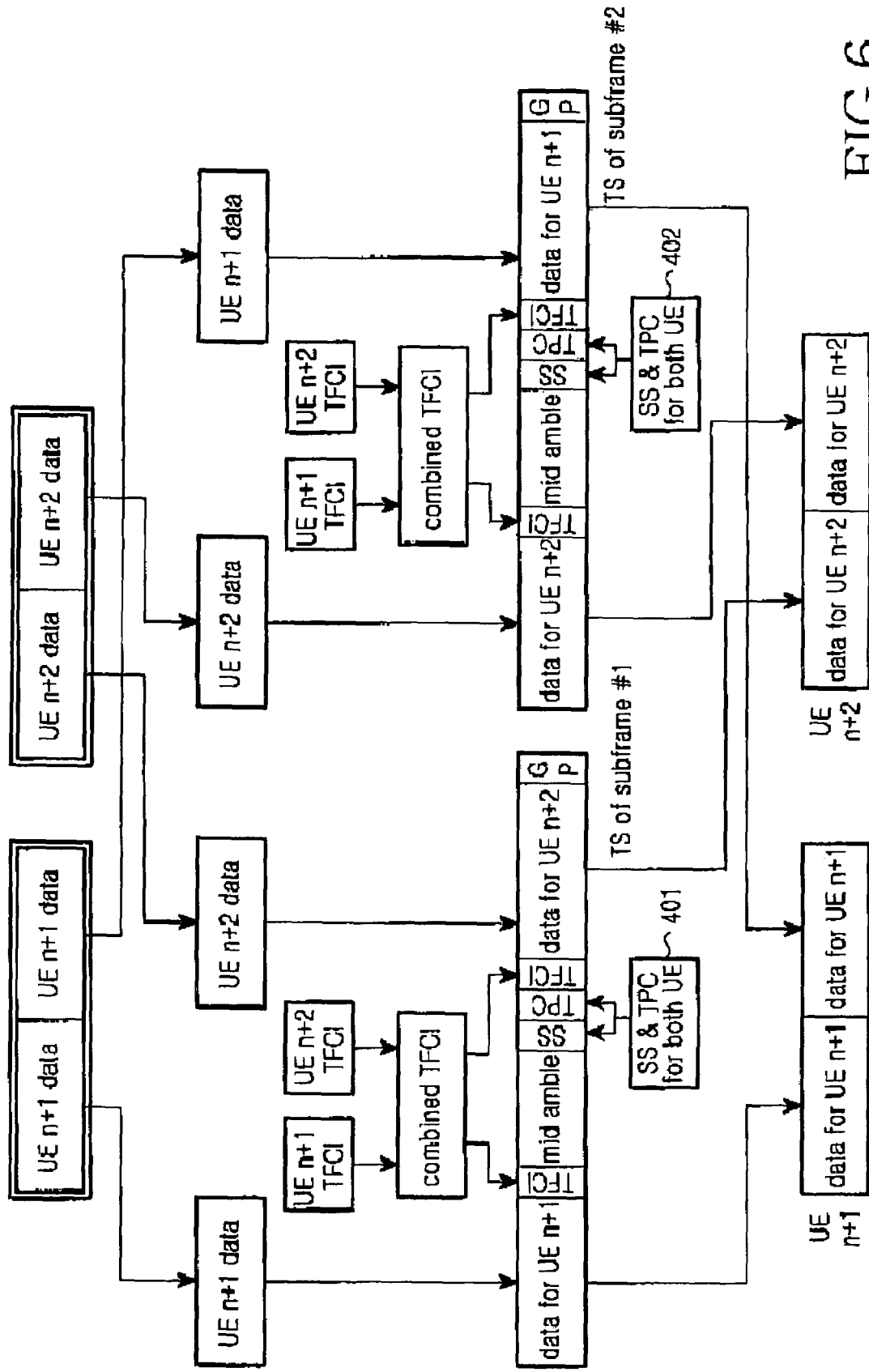
FIG. 6 illustrates a shared TS according to another embodiment of the present invention.

Referring to FIG. 6, the TS is configured such that the TFCIs of both the UEs are sent on a subframe basis in the same manner as illustrated in FIG. 4. SSs/TPCs 401 and 402 for the two UEs are arranged at predetermined positions of the allocated TSs in the subframes. The UEs extract the combined SSs/TPCs from the predetermined positions in the TSs, decompose them to original SSs/TPCs, and obtain intended SSs/TPCs. The SSs/TPCs 401 and 402 are required commonly for the UEs, or for the individual UEs, respectively.

Figure 7:
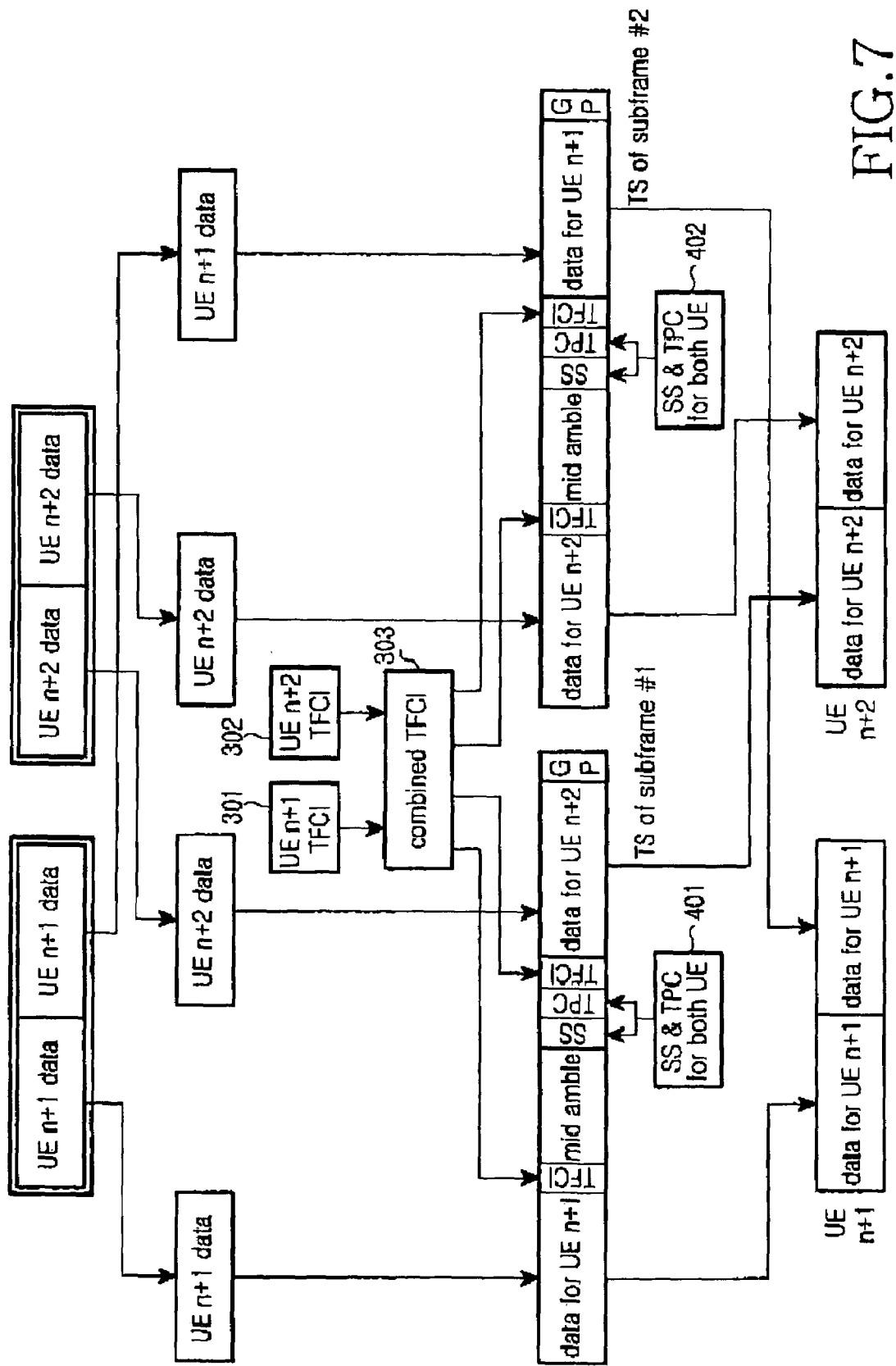
FIG. 7 illustrates a shared TS according to another embodiment of the present invention.

The TS structure illustrated in FIG. 7 is a combination of the TS structures illustrated in FIGS. 5 and 6. Referring to FIG. 7, the frame configurer 30 in the Node B constructs one combined TFCI 303 by combining TFCIs 301 and 302 in a predetermined method. The combined TFCI is allocated in the two subframes, that is, at predetermined positions of the two TSs. 4. The SSs/TPCs 401 and 402 for the two UEs are arranged at predetermined positions of the TSs in the subframes.

The UEs extract the combined TFCI from the predetermined positions of the TSs, decompose it into original TFCIs in the reverse order of the combination performed in the Node B, and acquire their intended TFCIs. Also, the UEs extract the combined SSs/TPCs from the predetermined positions in the TSs, decompose them to original SSs/TPCs, and obtain intended SSs/TPCs.

While the TS structures in which one DPCH is shared between two UEs have been described in the context of an NB-TDD communication system using one radio frame structure formed with two subframes, the present invention is obviously expandable to three or more UEs. When an odd number of UEs receive data from a Node B, null data is loaded in an area for the last one UE in the TS structures as illustrated in FIGS. 4 to 7.

In accordance with the present invention as described above, because the number of channels for carrying data from a Node B to UEs is reduced, the amount of channel resources used can be reduced by a half. That is, on an enhanced uplink for fast data transmission, resources used for transmission of a short control parameter that does not occupy an entire TS are saved by a half, while transmitting the necessary information. Therefore, system resources can be saved.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method of sharing a downlink dedicated physical channel (DL-DPCH) in a narrow-band time division duplexing (NB-TDD) system, comprising the steps of:
   allocating two time slots at a same position in two subframes that form one radio frame as a DPCH for at least two user equipments (UEs);
   arranging data and control information for the UEs in the two time slots;
   transmitting the data and control information to the UEs;
   extracting the data and control information from the two time slots; and
   acquiring, by the UEs, the data and control information destined for each of the UEs.

2. The method of claim 1, wherein the step of arranging the data and control information comprises the steps of:
   segmenting the data of a first of the UEs into two first data segments;

arranging the two first data segments in the two time slots;
segmenting the data of a second of the UEs into two second data segments; and
arranging the two second data segments in the two time slots.

3. The method of claim 2, wherein the step of arranging the two first data segments in the two time slots comprises the steps of:
arranging one of the two first data segments in a first data area of a first time slot and the other first data segment in a last data area of a second time slot.

4. The method of claim 3, wherein the step of arranging the two second data segments in the two time slots comprises the steps of:
arranging one of the two second data segments in a last data area of the first time slot and the other second data segment in a first data area of the second time slot.

5. The method of claim 1, wherein the control information for each of the UEs includes a transport format combination indicator (TFCI) for indicating how transport channels are mapped, a synchronization shift (SS) used for uplink transmission synchronization, and a transmit power control (TPC) for providing transmit power control information.

6. The method of claim 5, wherein the step of arranging the data and control information comprises the steps of:
combining TFCIs of the two UEs; and
arranging the combined TFCI at a predetermined position in one of the two time slots.

7. The method of claim 5, wherein the step of arranging the data and control information comprises the steps of:
combining TFCIs of the two UEs; and
arranging the combined TFCI at predetermined positions in the two time slots.

8. The method of claim 5, wherein the step of arranging the and control information comprises the steps of:
arranging an SS and a TPC of a second of the UEs at a predetermined position in one of the two time slots; and
arranging an SS and a TPC of a first of the UEs at a predetermined position in the other time slot.

9. The method of claim 5, wherein the step of arranging the and control information comprises the steps of:
combining the SSs and TPCs of the two UEs; and
arranging the combined SS and the combined TPC at predetermined positions of the two time slots.

10. An apparatus for sharing a downlink dedicated physical channel (DL-DPCH) in a narrow-band time division duplexing (NB-TDD) system, comprising:
a transmitter for allocating two time slots at a same position in two subframes that form one radio frame as a DPCH for first and second user equipments (UEs), arranging data and control information for the first and second UEs in the two time slots, and transmitting the data and control information to the first and second UEs; and
a receiver in each of the first and second UEs, for extracting the data and control information from the two time slots and acquiring the data and control information destined for each of the first and second UEs,
wherein the transmitter comprises:
a first data generator for generating first data for the first UE;
a second data generator for generating second data for the second UE;
a first data divider for dividing the first data into two first data segments;
a second data divider for dividing the second data into two second data segments;
a first control information generator for selectively generating first control information for the first UE;
a second control information generator for selectively generating second control information for the second UE; and
a frame configurer for forming a radio frame with two subframes including two allocated time slots in which the first and second data segments and the first and second control information are arranged at predetermined positions, and
wherein the receiver comprises:
a frame analyzer for receiving the radio frame, separating the radio frame into the two subframes, and detecting the two time slots from the subframes;
a control information extractor for detecting desired control information from the two time slots according to a predetermined time slot structure; and
a data extractor for detecting desired data segments from the two time slots.

11. The apparatus of claim 10, wherein the frame configurer arranges one of the two first data segments in a first data area of a first time slot and the other first data segment in a last data area of a second time slot, and arranges one of the two second data segments in a last data area of the first time slot and the other second data segment in a first data area of the second time slot.

12. The apparatus of claim 10, wherein each of the first and second control information comprises:
a transport format combination indicator (TFCI) for indicating how transport channels are mapped;
a synchronization shift (SS) used for uplink transmission synchronization; and
a transmit power control (TPC) for providing transmit power control information.

13. The apparatus of claim 12, wherein the frame configurer combines TFCIs of the two UEs and arranges the combined TFCI at a predetermined position in one of the two time slots.

14. The apparatus of claim 12, wherein the frame configurer combines TFCIs of the two UEs and arranges the combined TFCI at predetermined positions in the two time slots.

15. The apparatus of claim 12, wherein the frame configurer arranges an SS and a TPC of the second UE at a predetermined position in one of the two time slots, and arranges an SS and a TPC of the first UE at a predetermined position in the other time slot.

16. The apparatus of claim 12, wherein the frame configurer combines the SSs and TPCs of the first and second UEs and arranges the combined SS and the combined TPC at predetermined positions of the two time slots.

* * * * *